United States Patent
Yang

(10) Patent No.: US 7,142,349 B2
(45) Date of Patent: Nov. 28, 2006

(54) METHOD AND STRUCTURE FOR REDUCING PARASITIC INFLUENCES OF DEFLECTION DEVICES ON SPATIAL LIGHT MODULATORS

(75) Inventor: Xiao Yang, Cupertino, CA (US)

(73) Assignee: Miradia Inc., Sunnyvale, CA (US)

( * ) Notice: Subject to any disclaimer, the term of this patent is extended or adjusted under 35 U.S.C. 154(b) by 79 days.

(21) Appl. No.: 11/031,976

(22) Filed: Jan. 7, 2005

(65) Prior Publication Data

US 2006/0152794 A1 Jul. 13, 2006

(51) Int. Cl.
G02B 26/00 (2006.01)
G02B 26/08 (2006.01)

(52) U.S. Cl. .................... 359/295; 359/223; 359/224; 359/291; 359/298

(58) Field of Classification Search .................. 359/223, 359/224, 291, 292, 295, 298
See application file for complete search history.

(56) References Cited

U.S. PATENT DOCUMENTS

| | | | |
|---|---|---|---|
| 4,229,732 A | 10/1980 | Hartstein et al. |
| 4,317,611 A | 3/1982 | Petersen |
| 4,566,935 A | 1/1986 | Hornbeck |
| 4,615,595 A | 10/1986 | Hornbeck |
| 5,061,049 A | 10/1991 | Hornbeck |
| 5,172,262 A | 12/1992 | Hornbeck |
| 5,311,360 A | 5/1994 | Bloom et al. |
| 5,382,961 A | 1/1995 | Gale, Jr. |
| 5,448,314 A | 9/1995 | Heimbuch et al. |
| 5,452,024 A | 9/1995 | Sampsell |
| 5,489,952 A | 2/1996 | Gove et al. |
| 5,504,614 A | 4/1996 | Webb et al. |
| 5,535,047 A | 7/1996 | Hornbeck |
| 5,583,688 A | 12/1996 | Hornbeck |
| 5,589,852 A | 12/1996 | Thompson et al. |
| 5,600,383 A | 2/1997 | Hornbeck |
| 5,661,591 A | 8/1997 | Lin et al. |
| 5,663,749 A | 9/1997 | Farris et al. |
| 5,742,419 A | 4/1998 | Dickensheets et al. |
| 5,757,536 A | 5/1998 | Ricco et al. |

(Continued)

FOREIGN PATENT DOCUMENTS

EP 1237032 A2 9/2002

OTHER PUBLICATIONS

Henley et al., "A New SOI Manufacturing Technology Using Atomic layer Cleaving." Silicon Genesis Corporation Campbell CA. pp. 1-5.

(Continued)

Primary Examiner—David N. Spector
(74) Attorney, Agent, or Firm—Townsend and Townsend and Crew LLP

(57) ABSTRACT

A spatial light modulator is provided. The spatial light modulator includes a first substrate, the first substrate comprising a plurality of electrodes adapted to receive control signals, and a bias grid coupled to the first substrate and electrically isolated from the plurality of electrodes. The spatial light modulator also includes a mirror plate electrically coupled to the bias grid and adapted to rotate from a first orientation to a second orientation in response to the control signals received by the plurality of electrodes. The spatial light modulator further includes a landing post support structure coupled to the first substrate and electrically coupled to the bias grid and a landing post coupled to the landing post support structure. The landing post is electrically coupled to the bias grid and adapted to make contact with the mirror plate positioned at the first orientation.

13 Claims, 6 Drawing Sheets

U.S. PATENT DOCUMENTS

| | | |
|---|---|---|
| 5,835,256 A | 11/1998 | Huibers |
| 5,999,306 A | 12/1999 | Atobe et al. |
| 6,038,056 A | 3/2000 | Florence et al. |
| 6,046,840 A | 4/2000 | Huibers |
| 6,049,317 A | 4/2000 | Thompson et al. |
| 6,172,797 B1 | 1/2001 | Huibers |
| 6,201,521 B1 | 3/2001 | Doherty |
| 6,252,277 B1 | 6/2001 | Chan et al. |
| 6,323,982 B1 | 11/2001 | Hornbeck |
| 6,337,760 B1 | 1/2002 | Huibers et al. |
| 6,356,378 B1 | 3/2002 | Huibers |
| 6,386,661 B1 | 5/2002 | Richards |
| 6,396,619 B1 | 5/2002 | Huibers et al. |
| 6,429,033 B1 | 8/2002 | Gee et al. |
| 6,522,454 B1 * | 2/2003 | Meier et al. ............. 359/291 |
| 6,528,887 B1 * | 3/2003 | Daneman et al. ........ 257/774 |
| 6,529,310 B1 | 3/2003 | Huibers et al. |
| 6,538,800 B1 | 3/2003 | Huibers |
| 6,542,653 B1 | 4/2003 | Wu et al. |
| 6,543,286 B1 | 4/2003 | Garverick et al. |
| 6,643,426 B1 * | 11/2003 | McDonald .............. 385/18 |
| 6,809,852 B1 | 10/2004 | Tao et al. |
| 7,026,695 B1 * | 4/2006 | Yang et al. ............. 257/414 |
| 2002/0041455 A1 | 4/2002 | Sawada et al. |
| 2002/0071166 A1 | 6/2002 | Jin et al. |
| 2002/0071169 A1 | 6/2002 | Bowers et al. |
| 2002/0132389 A1 | 9/2002 | Patel et al. |
| 2003/0117686 A1 | 6/2003 | DiCarlo |
| 2004/0004753 A1 | 1/2004 | Pan |
| 2004/0008402 A1 | 1/2004 | Patel et al. |
| 2004/0125347 A1 | 7/2004 | Patel et al. |
| 2004/0136044 A1 | 7/2004 | Miller et al. |
| 2004/0184133 A1 | 9/2004 | Su et al. |
| 2004/0190817 A1 | 9/2004 | Aubuchon |
| 2005/0041277 A1 | 2/2005 | Huibers |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon. IBM J. Res. Develop., Jul. 1979, pp. 376-385. vol. 23, No. 4.

* cited by examiner

METHOD AND STRUCTURE FOR REDUCING PARASITIC INFLUENCES OF DEFLECTION DEVICES ON SPATIAL LIGHT MODULATORS

BACKGROUND OF THE INVENTION

This present invention relates generally to manufacturing objects. More particularly, the invention provides a method and structure for reducing parasitic influences of deflection devices on spatial light modulators. Merely by way of example, the invention has been applied to a spatial light modulator including a micro-mirror with reduced parasitic forces. The method and structure can be applied to other electro-mechanical technology as well, including actuators and sensors.

Micro-electromechanical systems (MEMS) are used in a number of application areas. For example, MEMS have been used in micro-mirror arrays, sensors, and actuators. In some of these applications, a suspended member is attracted to an electrode upon application of an electrical force and restored to an original position by a restoring force. As the suspended member approaches the electrode, surface forces can exert influences on the MEMS. These surface forces are sometimes referred to as "stiction" forces, since in some MEMS, parasitic forces arise from a combination of MEMS components sticking together and from friction, thus the term stiction. These parasitic forces may be strong enough to overcome the restoring force, resulting in an undesirable adhesion of the suspended member to the electrode.

As merely an example, conventional MEMS have relied upon a variety of techniques to overcome such stiction forces. For example, certain devices have relied upon the coating of MEMS components and the use of complex mechanical structures. Unfortunately, these techniques also have limitations. For example, some coatings are difficult to deposit on small components and can require complex deposition equipment. Moreover, complex mechanical structures may have reliability and lifetime concerns. Therefore, there is a need in the art for methods and apparatus to reduce parasitic forces in electro-mechanical systems.

BRIEF SUMMARY OF THE INVENTION

According to the present invention, a method and structure for reducing parasitic influences of deflection devices on spatial light modulators is provided. Merely by way of example, the invention has been applied to a spatial light modulator including a micro-mirror with reduced parasitic forces. The method and structure can be applied to other electro-mechanical technology as well, including actuators and sensors.

In one embodiment of the present invention, a spatial light modulator is provided. The spatial light modulator comprises a first substrate, which includes a plurality of electrodes adapted to receive control signals. The spatial light modulator also comprises a bias grid coupled to the first substrate and electrically isolated from the plurality of electrodes. The spatial light modulator further comprises a mirror plate, electrically coupled to the bias grid, and adapted to rotate from a first orientation to a second orientation in response to the control signals received by the plurality of electrodes. Moreover, the spatial light modulator comprises a landing post support structure coupled to the first substrate and electrically coupled to the bias grid and a landing post coupled to the landing post support structure, electrically coupled to the bias grid, and adapted to make contact with the mirror plate positioned at the first orientation.

In an alternative embodiment of the present invention, a spatial light modulator adapted to reflect incident light is provided. The spatial light modulator comprises a control substrate having a plurality of electrodes coupled to the control substrate and adapted to receive control signals, a mirror plate adapted to tilt in a first plane in response to the control signals, and a plurality of landing post support structures coupled to the control substrate and spatially arranged in a two-dimensional pattern as an array. The spatial light modulator further comprises a plurality of landing posts coupled to the landing post support structures and adapted to arrest the motion of the mirror plate.

In yet another specific embodiment of the present invention, a method of fabricating contact structures for use in a spatial light modulator is provided. The method comprises providing a first substrate having a device surface and a backside surface and depositing a first layer on the device surface, the first layer having an upper surface opposite the device surface. The method further comprises patterning the first layer to define a plurality of contact structure openings passing through the first layer from the upper surface to the first substrate, depositing a condcutive layer on the upper surface of the first layer, and performing a chemical mechanical polishing step to reduce the thickness of the conductive layer. The method also comprises removing at least a portion of the first layer to expose a plurality of contact structures, joining a second substrate to the device surface of the first substrate to form a bonded substrate structure, and forming a mirror structure in at least one layer of the bonded substrate structure.

Numerous benefits are achieved using the present invention over conventional techniques. The present invention provides a means to simplify fabrication of spatial light modulator components. Moreover, the present invention provides a flexible design that can be optimized to meet the needs of particular applications. For example, the size and position of landing posts may be modified depending on the design constraints presented by a given application. In addition, the flexibility of design extends to materials optimized for particular applications. In embodiments according to the present invention, complex coatings are not necessary to reduce parasitic forces present in the MEMS. In certain embodiments, the invention also provides a way of operating a MEMS device to overcome stiction forces. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

Embodiments according to the present invention provide a method and structure for reducing parasitic influences of deflection devices on spatial light modulators. Merely by way of example, the invention has been applied to a spatial light modulator including a micro-mirror with reduced parasitic forces. The method and structure can be applied to other electro-mechanical technology as well, including actuators and sensors.

Figure 1:
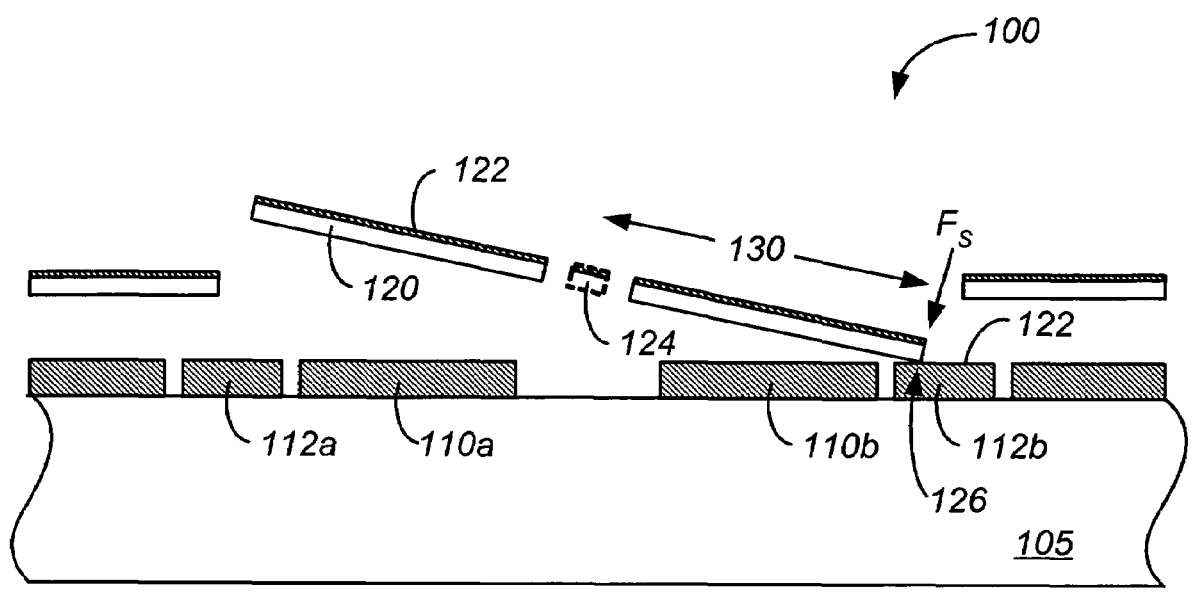
FIG. 1 is a simplified cross-sectional illustration of a conventional spatial light modulator.

FIG. 1 is a simplified cross-sectional illustration of a conventional spatial light modulator. Suspended member 120 is suspended at a predetermined height above a substrate 105. Suspended member 120 has a reflective surface 122 coupled to the member. In addition, a torsion spring 124 is coupled to both the suspended member and a support structure (not shown) on substrate 105. In the figure, an electric potential has been applied between electrodes 110 and the suspended member, resulting in tilting of the suspended member in a clockwise direction and placing the suspended member in an activated state. As illustrated, the right side of member 120 has been brought into contact at point 126 with contact pad 112b coupled to the substrate 105. In this activated state, torsion spring 124 exerts a counter-clockwise torque on the suspended member. The suspended members adjacent to member 120 are illustrated in a horizontal position, for example, in an unactivated state. In some applications, a bias of approximately 60 V is applied to both the suspended member and the contact pad 112b to place the suspended member and the contact pad at the same potential prior to and during contact between these structures.

Parasitic forces or stiction forces, represented by the vector $F_S$, present in the vicinity of point 126 will attract the suspended member toward the substrate, opposing forces attempting to return the suspended member to a horizontal state. If the suspended member becomes pinned in the position illustrated in the figure, it will not be able to transition between the horizontal and activated states, resulting in an undesirable condition.

In many MEMS applications, parasitic forces may exert an impact on system design and performance. The magnitude of the parasitic forces observed in a MEMS depends on a variety of factors. For example, if two portions of a MEMS are in contact with each other, a parasitic force dependent on the contact area may be present. In addition, the material used in the fabrication of the MEMS may impact the magnitude of the parasitic force. In some cases, the material dependence of the force is related to Van der Waals forces. As an additional example of the factors that can impact the magnitude of parasitic forces, an increase in the humidity of the MEMS environment typically increases the magnitude of the parasitic forces.

Figure 2A:
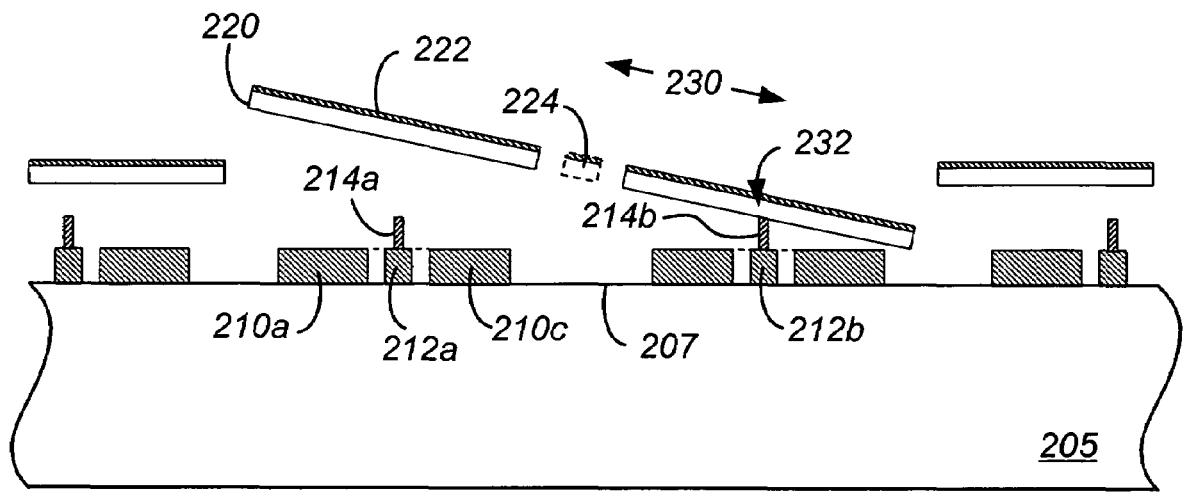
FIG. 2A is a simplified cross-sectional illustration of a spatial light modulator according to one embodiment of the present invention.

FIG. 2A is a simplified cross-sectional illustration of a spatial light modulator according to one embodiment of the present invention. A first surface 207 is provided with at least one electrically activated electrode 210 coupled to the first surface. The first surface can be made of any suitable material. The suitable material generally has mechanical stability and an ability to be processed using semiconductor processing techniques. As merely an example, the material can be a semiconductor. Preferably, the first surface is made from a silicon wafer, processed according to semiconductor processing techniques. Other materials may also be used in alternative embodiments according to the present invention.

The electrically activated electrode 210 is coupled to the first surface. The electrode can be made of materials that conduct electricity. Merely by way of example, the electrode in the embodiment according to the present invention illustrated in FIG. 2A is made of a metal preferentially deposited on the first surface. Preferably, the electrode is made of a multilayer stack of deposited titanium nitride, aluminum, and titanium nitride layers. In alternative embodiments according to the present invention, the electrode is made of greater of lesser numbers of layers, which may include other suitable conductors, such as tungsten.

Moveable structure 220 is attached to a support structure (not shown) by flexible member 224 and the support structure is coupled to the substrate 205. In the embodiment illustrated in FIG. 2, a portion of the upper surface 222 of the moveable structure is a reflective surface. For example, the power reflectance of portions of upper surface 222 may be greater than or equal to 90%. Moreover, in an embodiment according to the present invention, the flexible member is a torsion spring, but this is not required by the present invention. Alternative embodiments according to the present invention use other flexible members that bend in response to applied forces and subsequently return to their original shape after removal of such applied forces.

In the state illustrated in FIG. 2 a voltage $V_A$ has been applied to the electrode 210, deflecting the left side of the moveable structure away from the electrode and creating a restoring counter-clockwise torque in the flexible member. As the distance between the right side of the moveable structure and the first surface decreases, an interaction with one or more parasitic forces produces a force that acts on the moveable structure. In an embodiment according to the present invention, at least one landing post 214b is adapted to make contact with the suspended member at location 232, thereby maintaining an outer portion of the moveable structure free from physical contact with the first surface or the electrodes 210 and reducing a magnitude of one or more parasitic forces. The landing post is fabricated from suitable materials as will be described more fully below.

As illustrated in FIG. 2A, landing posts 214 are coupled to landing post support structures 212. In a specific embodiment, landing posts 214 are fabricated to form electrical contact with landing post support structures 212, which are electrically coupled to a bias grid. As illustrated, landing post support structures 212 are electrically isolated from electrodes 110. Typically, the bias grid is electrically connected to the moveable structure. In some embodiments, the bias grid is present on the same masking level as the electrodes 210 and landing post support structures 212. In alternative embodiments, the bias grid is present on the same masking level as metals deposited and patterned prior to electrodes 210 and landing post support structures 212. In these alternative embodiments, the bias grid is electrically connected to the landing post support structures 212 through the use of vias, reducing the number of physical structures present at the electrodes masking level and simplifying the electrical design. One of ordinary skill in the art would recognize many variations, modifications, and alternatives.

Thus, in some embodiments of the present invention, the landing posts serve both a mechanical function as a landing post and an electrical function in carrying the bias grid signal.

In some embodiments of the present invention, the landing posts are formed from a material selected for such properties as electrical conductivity and mechanical rigidity. For example, in one embodiment, the landing posts are formed from tungsten. In other embodiments, other materials, including polysilicon and aluminum are used to form the landing posts. Of course, one of ordinary skill in the art would recognize many variations, modifications, and alternatives.

In embodiments according to the present invention, the height, length, and width of the landing posts 214 are predetermined values. In the embodiment illustrated in FIG. 2 the landing post is formed using a tungsten via plug process. Some embodiments of the present invention utilize conventional design rules for the tungsten via plug process. For example, tungsten plugs with circular cross-sections and a diameter of 0.4 μm are used in a specific embodiment. In an alternative embodiment, square tungsten plugs having a cross-sectional side length of 0.4 μm are utilized. In these embodiments, the plug-to-plug spacing is typically 0.6 μm and the plug height is about 0.8 μm. Of course, the specific dimensions utilized for the via plugs vary in other embodiments as a function of the design rules for the particular process.

In the embodiment illustrated in FIG. 2A, the height, width, and length of the via plugs define a plurality of side surfaces oriented in planes generally normal to the first surface and the electrically activated electrode. In the embodiment illustrated in FIG. 2A, both the individual and combined surface areas of these side surfaces is larger than the surface area of the top of the landing post. In embodiments in accordance with the present invention, the top of the landing post will contact the moveable member when the moveable member is in an activated state. The small surface area of the top of the landing post will reduce the magnitude of stiction forces in comparison with the stiction forces that would result from the moveable member coming into contact with the contact pad in FIG. 1.

Moreover, in embodiments according to the present invention, the distance 230 from the flexible member to the landing post is a predetermined distance. In the embodiment illustrated in FIG. 2A, the distance from the flexible member to the landing post is 5 μm. Alternatively, the distance ranges from about 1 μm to about 8 μm in other embodiments. Of course, the distance from the flexible member to the landing post will depend on the particular applications. In some embodiments according to the present invention, the distance from the flexible member to the landing post is reduced to reduce the parasitic torque present at the flexible member. This parasitic torque is a function of the distance from the landing post to the flexible member and the component of the parasitic force $F_S$ perpendicular to the moveable structure, present at the top of the landing post, which acts on the moveable structure.

In embodiments according to the present invention, the height and position of the landing post are selected so that the upper surface of the moveable structure is tilted at a predetermined angle with respect to the horizontal when the moveable structure is in the activated state. In embodiments according to the present invention in which the upper surface of the moveable structure comprises reflective portions, an incident ray of light will be reflected at predetermined angles depending on the tilt angle of the moveable structure. In the embodiment illustrated in FIG. 2A, the height and position of the landing post are selected so that the moveable structure is tilted at an angle of 12° with respect to the horizontal in the activated state. Alternative embodiments have either increased or decreased tilt angles with respect to the horizontal.

Moreover, in embodiments according to the present invention, the length of the moveable structure along direction 230 is a predetermined length. In the embodiment illustrated in FIG. 2A, this length is 15 μm. Alternatively, the length ranges from a few microns to several hundred microns in other embodiments. Of course, the length of the moveable structure along direction 230 will depend on the particular applications.

Preferably, the dimensions of the moveable structure are selected so that when the moveable structure makes contact with the landing post, the right edge of the moveable structure is at a predetermined distance above the surface 207. As illustrated, the right edge of the moveable structure does not make contact with the surface 207, thereby reducing stiction forces associated with contact between the moveable structure and the surface 207. Depending on the application, the separation distance is selected to modify one or more parasitic forces and/or modify the tilt angle of the moveable structure.

Figure 2B:
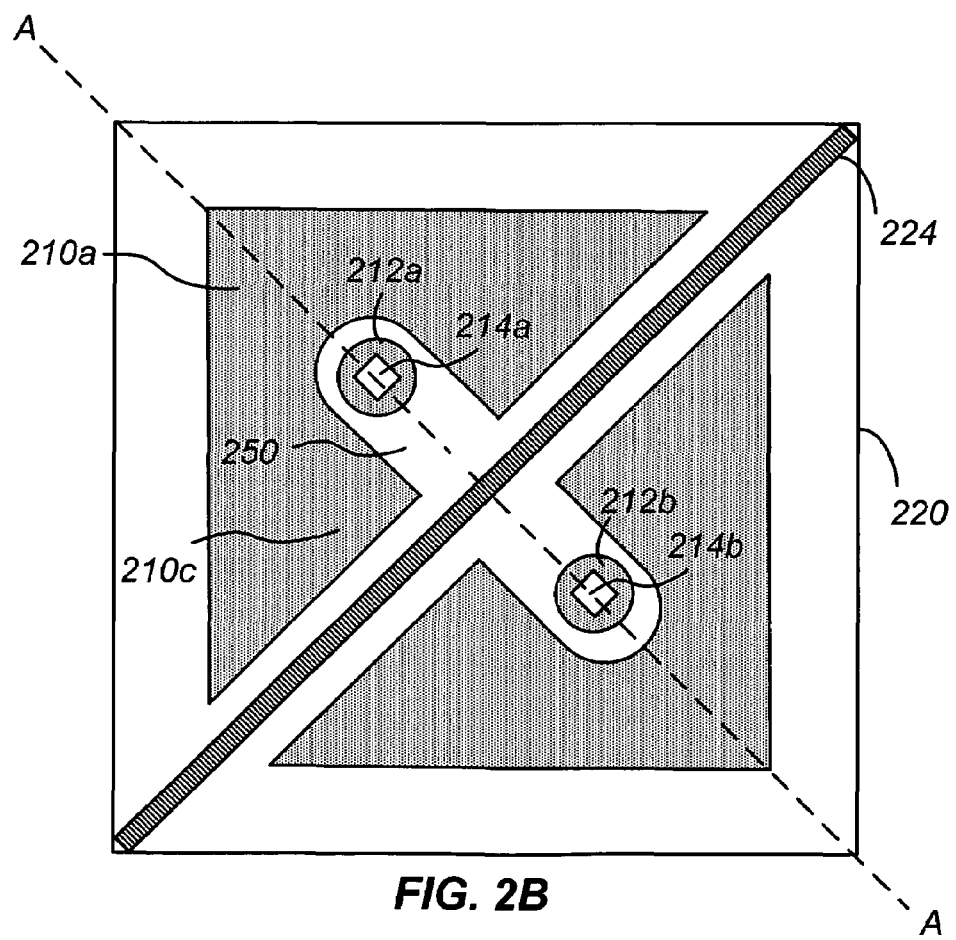
FIG. 2B is a simplified top-view illustration of a spatial light modulator according to one embodiment of the present invention.

FIG. 2B is a simplified top-view illustration of a spatial light modulator according to one embodiment of the present invention. In relating FIG. 2B to FIG. 2A, the cross-section along line A—A in FIG. 2B corresponds to the cross-section illustrated in FIG. 2A. Thus, the dashed lines between electrodes sections 210a and 210c in FIG. 2A are illustrated as the same sections 210a and 210c in FIG. 2B, with landing post support structures 212a and 214a approximately located centrally on electrode 210. Electrode 210, which has a generally triangular shape when viewed from the top, has a indented region 250 that provides for physical and electrical separation of landing post support structures 212a and 214a from the electrode. Moveable structure 220 is illustrated in FIG. 2B as a square region coupled to flexible member 224. Complementary structures are illustrated in the figure, including landing post support structure 212b and landing post 214b.

As illustrated in FIG. 2B, landing post 214a has a square cross-sectional area. As discussed previously, this particular geometry is not required by embodiments according to the present invention. Moreover, although landing post support structure 212a is illustrated with a circular cross-sectional area, this also is not required by embodiments according to the present invention. Alternative shapes are provided in alternative embodiments according to the particular application. Moreover, the distance from the landing post to the flexible member is variable depending on the particular application. As discussed above, the parasitic torque is a function of the distance from the landing post to the flexible member and the component of the parasitic force $F_S$ perpendicular to the moveable structure, present at the top of the landing post. Thus, decreasing the distance from the landing post to the flexible member by moving the position of the landing post will influence the parasitic torque associated with the spatial light modulator.

Embodiments according to the present invention provide electro-mechanical mirror systems configured to controllably reflect incident optical radiation. However, the present invention is applicable to a broad class of electro-mechanical systems in which parasitic forces are present. For many electro-mechanical systems, proper device functionality necessitates incorporation of design elements directed at reducing the magnitude and impact of parasitic forces. For example, many MEMS features design elements directed at reducing stiction forces. Embodiments in accordance with the present invention reduce parasitic forces in this class of electro-mechanical systems and particularly in MEMS. Additional details of certain features of the present electro-mechanical system can be found in U.S. application Ser. No. 10/756,936, filed Jan. 13, 2004, commonly owned and incorporated by reference for all purposes.

Figure 3A:
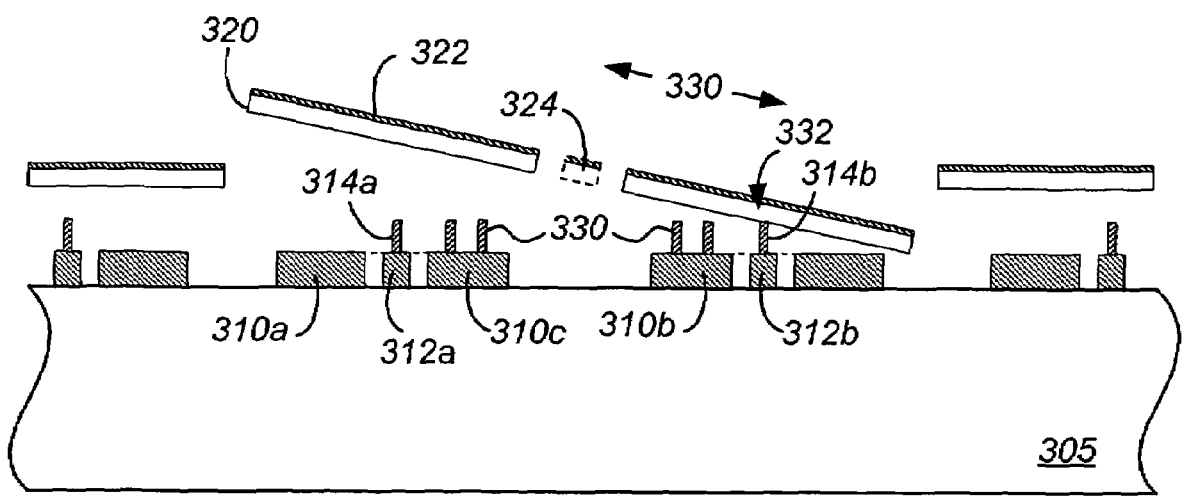
FIG. 3A is a simplified cross-sectional illustration of a spatial light modulator according to another embodiment of the present invention.

FIG. 3A is a simplified cross-sectional illustration of a spatial light modulator according to another embodiment of the present invention. The spatial light modulator illustrated in the figure incorporates features of the embodiment illustrated in FIG. 2A and further includes secondary electrode structures 330 coupled to electrodes 310c and 310b. When a voltage bias is applied between the moveable structure 320 and the electrodes 310, the mirror plate is deflected due to electrostatic attraction. The electric field resulting from an electric potential applied to the electrode decreases as a function of distance from the electrode 310. Accordingly, secondary electrodes 330 effectively extend the height of the electrode above that provided by the metals deposited to form the electrode, effectively decreasing the distance between the electrodes and the moveable structure, thereby increasing the magnitude of the electric field experienced by the moveable structure 320.

In a specific embodiment, the secondary electrodes 330 are fabricated during the same via formation process as that used to fabricate the landing posts 314a and 314b. The dimensions of the secondary electrodes are pre-selected depending on the design rules selected for the via formation process. In some embodiments, the secondary electrodes have the same dimensions as the landing posts, but this is not required by embodiments of the present invention. As described above, typically the landing posts are formed from a material selected for such properties as electrical conductivity and mechanical rigidity. For example, in one embodiment, the secondary electrodes and the landing posts are formed from tungsten. In other embodiments, other materials, including polysilicon and aluminum are used to form the secondary electrodes and the landing posts. Therefore, in one specific embodiment, a tungsten plug formation step produces structures that provide both mechanical (landing post) and electrical (secondary electrode) functions.

Figure 3B:
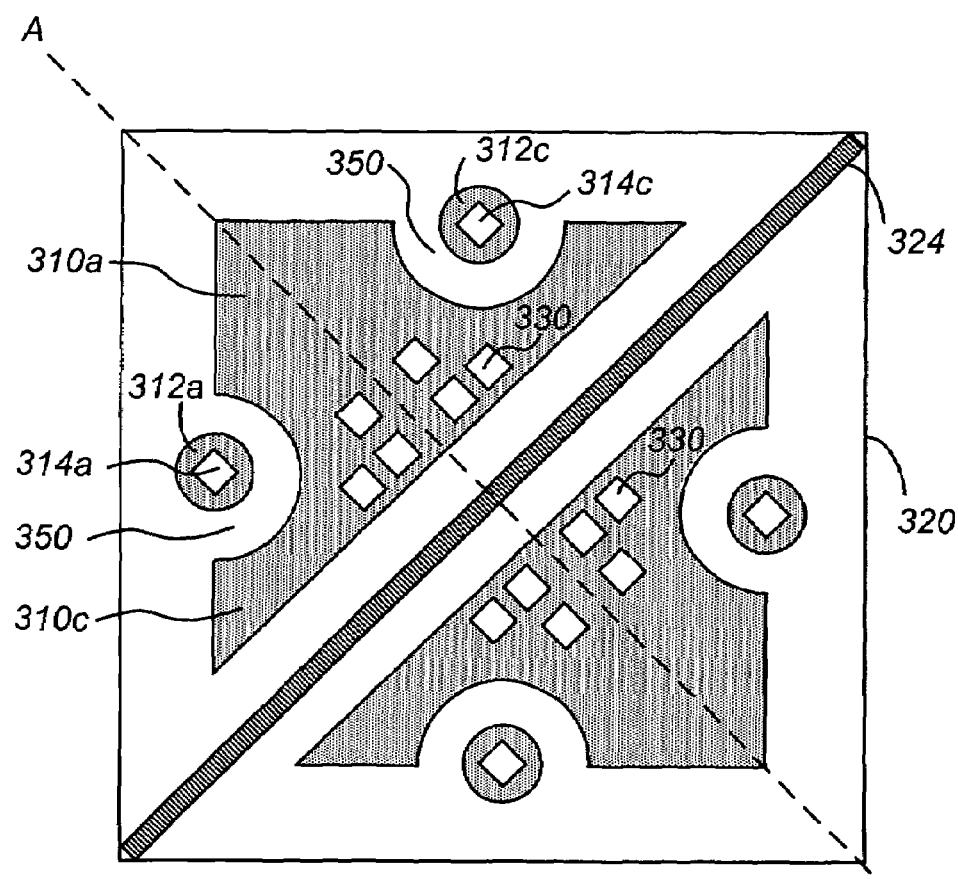
FIG. 3B is a simplified top-view illustration of a spatial light modulator according to another embodiment of the present invention.

FIG. 3B is a simplified top-view illustration of a spatial light modulator according to another embodiment of the present invention. As shown in the figure, electrode 310 has a generally triangular shape when viewed from the top. However, in a design differing from that illustrated in FIG. 2B, two landing posts 314a and 314c are provided on each side of the flexible member 324. Moveable structure 320 is once again illustrated by a square shape, although, this particular square geometry is not required by the present invention. Inset in two sides of the generally triangular electrode 310 are semi-circular indented regions 350, which provide for physical and electrical isolation of structures 312 and 314 from the electrode. Although the indented regions are semi-circular in shape in FIG. 3B, this is not required by embodiments of the present invention. Alternative shapes are utilized in alternative embodiments according to the present invention. Moreover, the number and placement of the landing posts are varied in particular embodiments of the present invention as will be evident to one of skill in the art. The placement of the landing posts at the edges of the generally triangular electrode is merely one example of possible placements utilized in embodiments of the present invention.

Secondary electrodes 330 are fabricated at pre-selected locations on electrode 310 in FIG. 3B. Although only twelve secondary electrodes are illustrated in the figure, this is merely one example of a secondary electrode arrangement. Arrangement with a different number of secondary electrodes and/or with a different placement pattern are utilized in alternative embodiments.

Figure 4A:
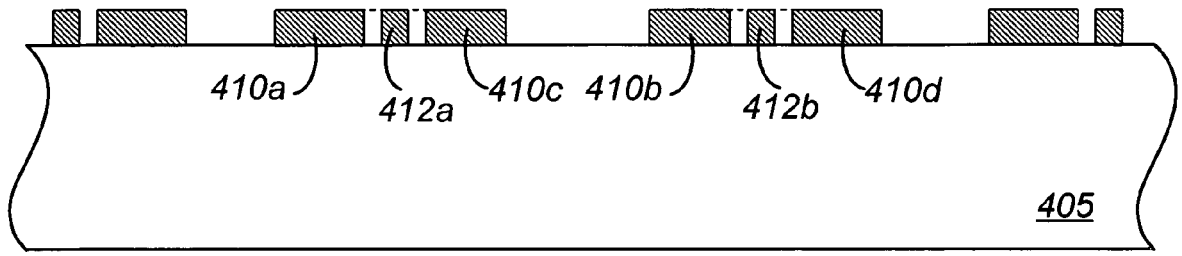
FIGS. 4A–4H are simplified cross-sectional illustrations of a process flow for fabricating a spatial light modulator according to one embodiment of the present invention.

FIGS. 4A–4F are simplified cross-sectional illustrations of a process flow for fabricating a spatial light modulator according to one embodiment of the present invention. As illustrated in FIG. 4A, a substrate 405 is provided. Substrate 405 can be made of any suitable material. The suitable material generally has mechanical stability and an ability to be processed using semiconductor processing techniques. As merely an example, the material can be a semiconductor. Preferably, the first surface is made from a single crystal silicon wafer, processed according to semiconductor processing techniques. Other materials may also be used in alternative embodiments according to the present invention. In one embodiment of the present invention, the silicon wafer is processed using standard CMOS processing techniques to form an array of control circuitry and electrodes on the substrate. Additional details regarding one example of the fabrication of the control circuitry and electrodes are described in U.S. application Ser. No. 10/756,923, filed Jan. 13, 2004, commonly owned and hereby incorporated by reference for all purposes.

As illustrated in FIG. 4A, a number of electrodes 410 are coupled to the surface of substrate 405. Preferably, the electrodes are made of a multilayer stack of deposited titanium nitride, aluminum, and titanium nitride layers. In some embodiments, the electrodes 410 are distributed in an array pattern and coupled to addressing and control circuitry (not shown). Each electrode is associated with a micro-mirror and controls the deflection of that micro-mirror. The addressing and control circuitry allow the selection and activation of particular electrodes to control the deflection of the micro-mirror associated with that electrode. Electrodes 410a and 410c are associated with each other and in some embodiments, are used to control the electric field created on one side of a micro-mirror. Electrodes 410b and 410d are associated with each other and in some embodiments, are used to control the electric field created on the other side of the micro-mirror. As an example, a micro-mirror associated with electrode 410 may have a left side, influenced by the electric field associated with electrodes 410a and 410c and a right side, influenced by the electric field associated with electrodes 410b and 410d.

Landing post support structures 412a and 412b are electrically isolated from electrodes 410 in the embodiment illustrated in FIG. 4A. Moreover, the bias grid is electrically connected to the landing post support structure. In some embodiments, the bias grid is present on the same masking level as the electrodes 410 and landing post support structures 412. In alternative embodiments, the bias grid is present on the same masking level as metals deposited and patterned prior to electrodes 410 and landing post support structures 412. In these alternative embodiments, the bias grid is electrically connected to the landing post support structures 412 through the use of vias, reducing the number of physical structures present at the electrodes masking level and simplifying the electrical design. One of ordinary skill in the art would recognize many variations, modifications, and alternatives. Thus, in some embodiments of the present invention, the landing post support structures serve both a mechanical or support function for the landing posts and an electrical function in carrying the bias grid signal to the landing posts.

As illustrated in FIG. 4A, the electrodes 410 and the landing post support structures 412 are defined on the same masking level, simplifying the process flow. In alternative embodiments, the landing post support structures are defined by masking levels prior to or subsequent to the masking levels associated with the electrodes. One of ordinary skill in the art would recognize many variations, modifications, and alternatives. Although the electrodes and landing post support structures illustrated in FIG. 4A may be defined on the same masking level, they are electrically isolated from each other in some embodiments of the present invention. The dashed lines joining the upper surfaces of the electrodes 410a and 410c illustrate examples of the present invention in which the electrode extends either behind or in front of the landing post support structure, or both. Referring back to FIG. 2B, a side view of the illustrated spatial light modulator along a line perpendicular to cross-section A—A would show the electrode 210 both in front of and behind the landing post support structure 212a when viewed along the line. Thus, although for purposes of clarity the electrode is illustrated as straddling the landing post support structure in FIG. 4A, this is not required by the present invention. In fact, referring to the simplified top-views illustrated in FIGS. 2B and 3B, one of skill in the art will appreciate a number of possible spatial relationships between the electrodes and the landing post support structures.

Figure 4B:
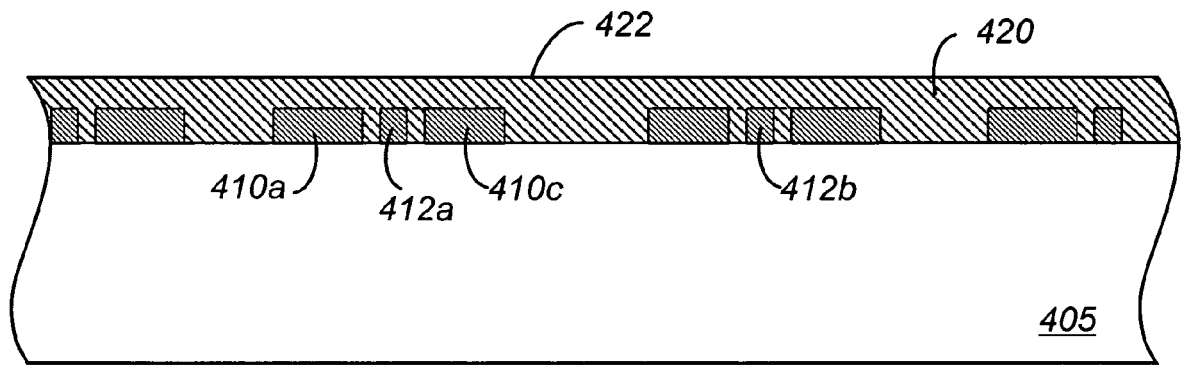

FIG. 4B illustrates a step of the process flow in which a dielectric layer 420 is deposited on substrate 405. In a specific embodiment, the dielectric layer is a silicon oxide layer commonly used in pre-metal dielectric (PMD) and intermetal dielectric (IMD) multilevel interconnect applications, but this is not required by the present invention. Alternative embodiments utilize layers of silicon nitride, silicon oxynitride, spin-on-glass (SOG), low-k dielectrics, or the like. Moreover, dielectric layer 420 may be formed by a combination of such layers. Preferably, the dielectric layer 420 is formed by a low temperature process that preserves the integrity of the control circuitry and electrodes fabricated on substrate 405 in previous processing steps. For example, a low temperature plasma enhanced chemical vapor deposition (PECVD) process is used in one embodiment to deposit an oxide and form the dielectric layer 420. Alternative embodiments employ atmospheric or low pressure chemical vapor deposition (CVD) processes to form the dielectric layer. The dielectric layer may be planarized after deposition, for example, by using a chemical mechanical polishing (CMP) process to form a uniform upper surface 422. Planarization processes for dielectric layers utilized in multilevel interconnect applications are well known to one of skill in the art.

Figure 4C:
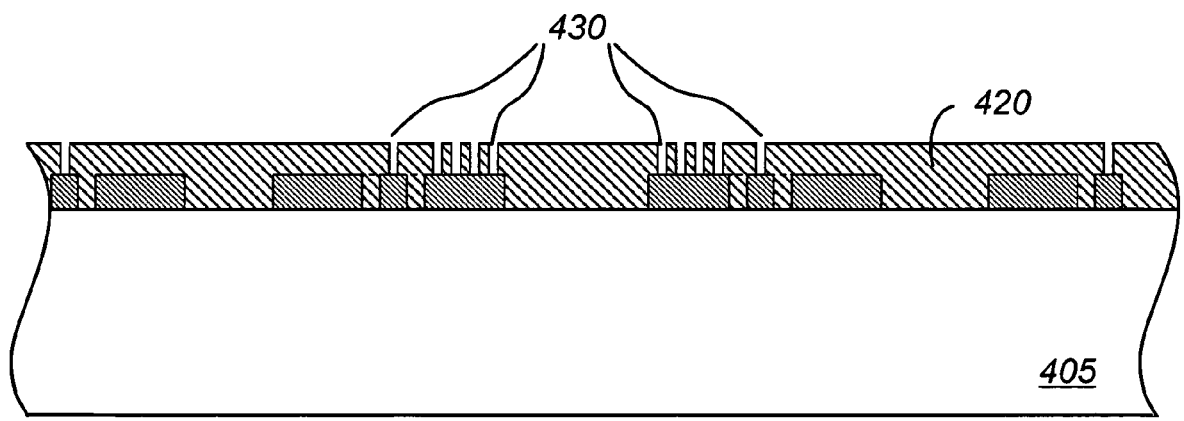

FIG. 4C illustrates the patterning and etching of dielectric layer 420 to form openings 430. In a typical process, a photoresist layer is deposited, exposed, and developed to form a patterned layer of photoresist. The patterned photoresist layer is used as an etch mask to selectively remove portions of the dielectric layer as illustrated by openings 430 in the figure. In an alternative embodiment, an etch mask layer is deposited prior to the formation of the photoresist layer. The etch mask layer is patterned using the photoresist layer as a pattern mask and subsequently used as an etch mask to selectively remove portions of the dielectric layer. Openings 430 are formed at a number of locations coupled to the electrodes 410 and the landing post support structures 412. In some embodiments, the openings 430 are fabricated using processes developed for contact holes through PMD layers and vias through IMD layers.

Figure 4D:
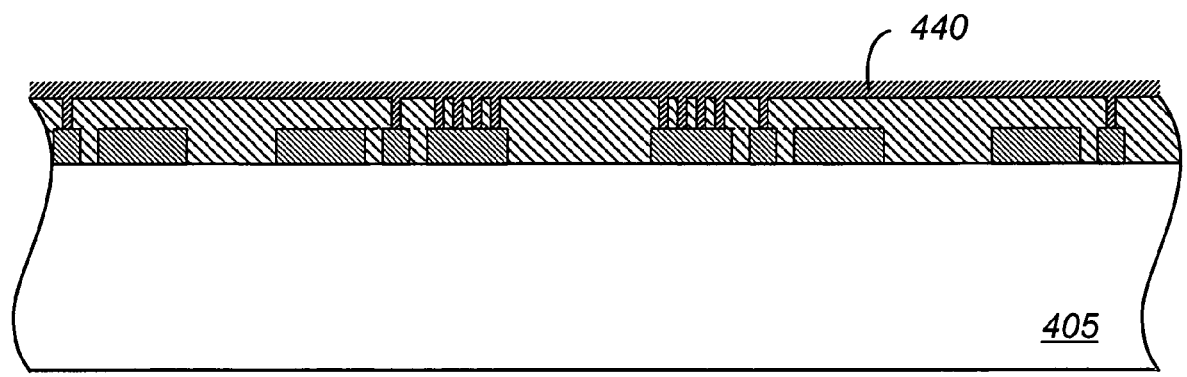

FIG. 4D illustrates the deposition of an electrically conductive layer 440 in contact with the dielectric layer. As illustrated, the electrically conductive layer has been deposited as a gap fill layer that fills the contact or via holes 430 and also covers the flat areas on the upper surface 422 of the dielectric layer. In a particular embodiment, the deposition of layer 440 is performed using standard gap fill processes commonly used for tungsten contact holes through PMD layers and vias through IMD layers. As such, in this particular embodiment, the tungsten plug completely fills the openings 430 without the formation of voids. In some embodiments, a generally conformal liner layer commonly used in contact hole/via plug formation processes is deposited prior to the deposition of electrically conductive layer 440. Merely by way of example, the conformal liner layer may be formed as a TiN, TiW, or Ti layer or combination thereof. One of ordinary skill in the art would recognize many variations, modifications, and alternatives. In alternative embodiments, the electrically conductive layer is formed using other materials, including polysilicon and aluminum.

Figure 4E:
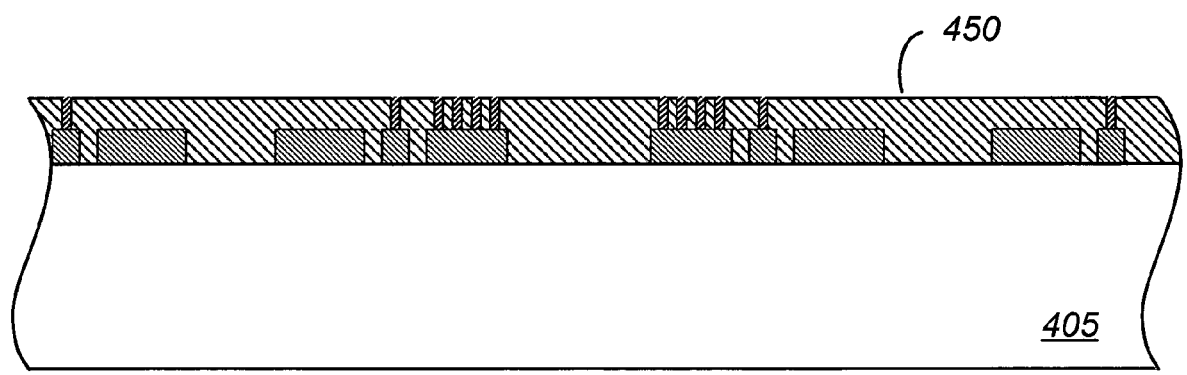

FIG. 4E illustrates the planarization of layer 440 to form a planarized upper portion 450 of the electrically conductive layer. In one embodiment, the planarization of the electrically conductive layer is accomplished by the use of a CMP process. In some embodiments, the planarization of the layer 440 produces a local surface root-mean-square (RMS) roughness for the surface of layer 440 on the order of 5 Å.

Considering FIGS. 4B–4E, one of skill in the art will recognize that the illustrated process flow is representative of commonly utilized PMD and IMD tungsten plug formation processes: deposition and patterning of the PMD or IMD layer followed by tungsten plug deposition and subsequent planarization through CMP. Thus, well-developed and well-characterized semiconductor processes are used in embodiments of the present invention, simplifying process integration issues. Moreover, these processes produce void free tungsten plugs suitable for use as landing posts.

Figure 4F:
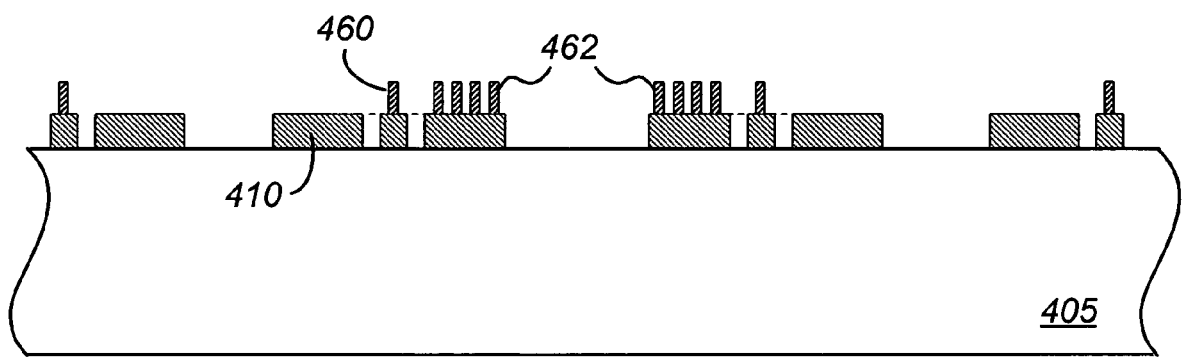

In FIG. 4F, the dielectric layer 420 is removed to expose the landing posts 460 and the secondary electrodes 462. Plasma ashing, among other methods, may be used to remove the dielectric layer. In some embodiments, a dielectric removal process is used that terminates at the upper surface of the electrodes 410, providing passivation of the electrode surfaces. The embodiments in which the dielectric removal process is terminated at the upper surface of the electrodes 410 results in simultaneous exposure of the secondary electrodes coupled with passivation of the electrodes and underlying surface of the substrate 405. In yet another embodiment, the dielectric removal process is terminated prior to exposure of the electrode layer, exposing the secondary electrodes and the landing posts, while providing additional passivation benefits to the electrodes on substrate 205.

Figure 4G:
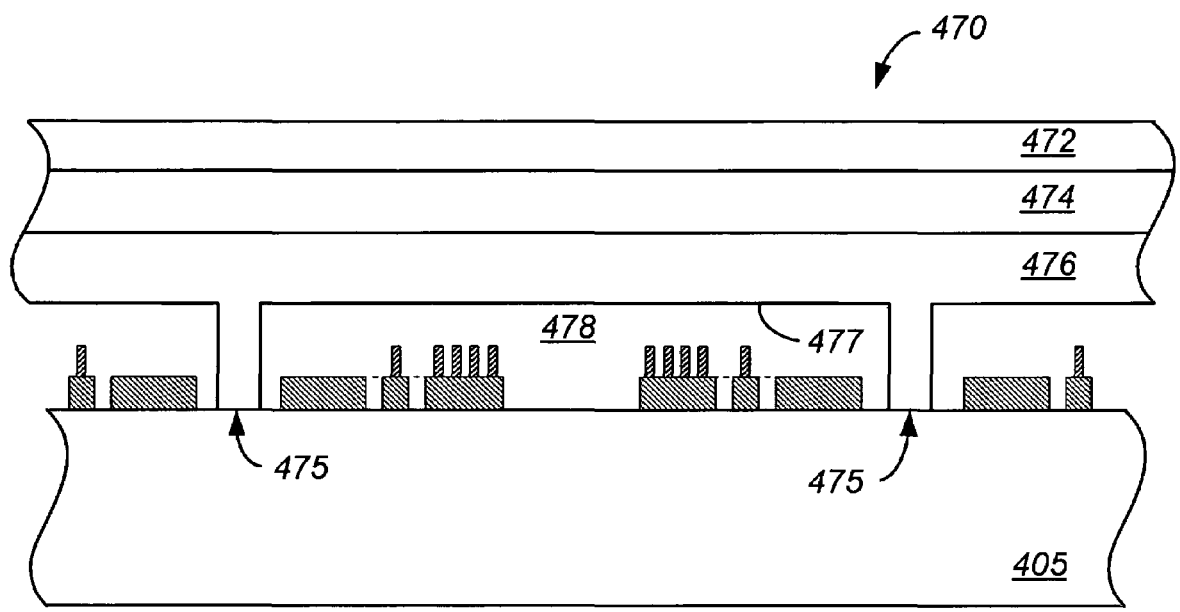

FIG. 4G illustrates a substrate bonding process in which a composite substrate structure is formed. Substrate 470 comprises a multilayer substrate structure. As illustrated in the figure, substrate 470 is a silicon-on-insulator (SOI) substrate including a silicon layer 472, a silicon dioxide layer 474 (buried oxide layer), and an additional silicon layer 476. Silicon layer 476 has been processed to form recessed regions 478 on a lower surface of layer 476. In a particular embodiment, the bonding surface 477 of layer 476 is a polished single crystal silicon surface. Wafer bonding techniques are used in some embodiments, to form a hermetic seal between layer 476 and substrate 405 at location 475. For example, bonding may be accomplished through the use of anodic, eutectic, fusion, covalent, glass frit, and other bonding techniques. In embodiments in which substrate 405 and layer 476 are silicon, room temperature covalent bonding techniques are used to form a hermetically sealed bond between the substrates. Of course, one of ordinary skill in the art would recognize many variations, modifications, and alternatives.

Although the composite substrate structure is illustrated in two dimensions in FIG. 4G, it will evident to one of skill in the art that a three-dimensional structure is provided by embodiments of the present invention. Recessed regions 478 extend into the plane of the figure, forming three-dimensional sealed cavities that surround the electrodes associated with a particular micro-mirror.

Figure 4H:
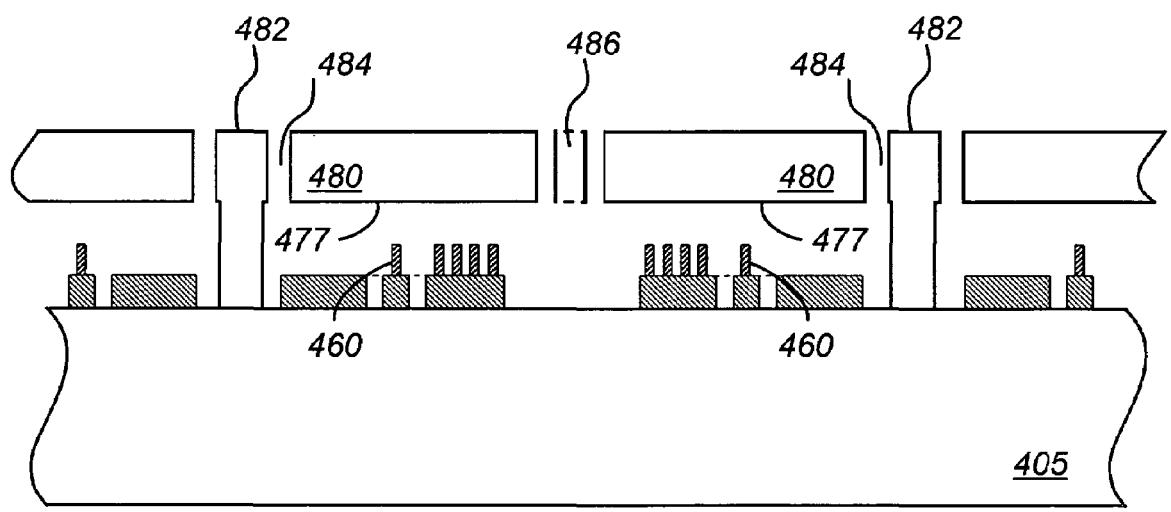

Upper layers of substrate 470 are removed in a subsequent processing step, as illustrated in FIG. 4H. In order to thin substrate 470 after bonding, thinning processes using chemical mechanical polishing (CMP), grinding, etch back, any combination of these, and the like are used. In one application, the buried oxide layer 474 provides an etch stop layer during the thinning process. Mirror structures are patterned and fabricated in layer 476 using semiconductor processing techniques. As illustrated in the figure, the mirror 480 has been separated from standoff structures 482 by the formation of etched openings 484. At the center of the mirror 480, a flexible hinge 486 has also been formed by an etching process. Although FIG. 4H illustrates a side view of the spatial light modulator, one of skill in the art will appreciate the three-dimensional nature of the illustrated structures. As illustrated in the figure, the mirror is able to tilt in clockwise and counter-clockwise directions in a plane aligned with the plane of the figure. The motion of the mirror in either the clockwise or counter-clockwise directions is stopped by contact with the landing posts 460. Although not illustrated in the figure, the surface 477 of layer 476 in recessed regions 478 may be processed to form structures complementary to the landing posts 460. For example, deposited features made from suitable material may be formed on surface 477 and adapted to make contact with the landing posts. These complementary structures may increase the reliability and improve the long-term performance of the spatial light modulator.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spatial light modulator comprising:
    a first substrate, the first substrate comprising a plurality of electrodes adapted to receive control signals;
    a bias grid coupled to the first substrate and electrically isolated from the plurality of electrodes;
    a mirror plate electrically coupled to the bias grid, and adapted to rotate from a first orientation to a second orientation in response to the control signals received by the plurality of electrodes;
    a landing post support structure coupled to the first substrate and electrically coupled to the bias grid; and
    a landing post coupled to the landing post support structure, electrically coupled to the bias grid, and adapted to make contact with the mirror plate positioned at the first orientation.

2. The spatial light modulator of claim 1 wherein the landing post makes both physical and electrical contact with the mirror plate positioned at the first orientation.

3. The spatial light modulator of claim 2 further comprising:
    a second landing post support structure coupled to the first substrate and electrically coupled to the bias grid; and
    a second landing post coupled to the second landing post support structure, electrically coupled to the bias grid, and adapted to make contact with the mirror plate positioned at the second orientation.

4. The spatial light modulator of claim 3 wherein the second landing post makes both physical and electrical contact with the mirror plate positioned at the second orientation.

5. The spatial light modulator of claim 1 further comprising a flexible member coupled to the mirror plate, wherein the mirror plate and the flexible member are made from a single section of a single crystal silicon substrate.

6. The spatial light modulator of claim 1 wherein the first and second landing posts are fabricated from tungsten.

7. The spatial light modulator of claim 1 wherein the first and second landing posts are fabricated using a premetal contact hole or inter-metal dielectric via plug process.

8. A spatial light modulator adapted to reflect incident light, the spatial light modulator comprising:
    a control substrate having a plurality of electrodes coupled to the control substrate and adapted to receive control signals;
    a mirror plate adapted to tilt in a first plane in response to the control signals;
    a plurality of landing post support structures coupled to the control substrate and spatially arranged in a two-dimensional pattern as an array; and
    a plurality of landing posts coupled to the landing post support structures and adapted to arrest the motion of the mirror plate.

9. The spatial light modulator of claim 8 wherein the plurality of landing posts comprises a first set of landing posts positioned under a first section of the mirror plate and a second set of landing posts positioned under a second section of the mirror plate.

10. The spatial light modulator of claim 9 wherein the first set of landing posts arrest the motion of the mirror plate with the mirror plate oriented at a first angle with respect to the plane of the landing posts and the second set of landing posts arrest the motion of the mirror plate with the mirror plate oriented at a second angle with respect to the plane of the landing posts.

11. The spatial light modulator of claim 10 wherein the first angle and the second angle are 12°.

12. The spatial light modulator of claim 8 wherein the landing posts are tungsten.

13. The spatial light modulator of claim 12 wherein the landing posts are formed using a tungsten premetal contact hole or inter-metal dielectric via plug process.

* * * * *